United States Patent [19]

Morris et al.

[11] Patent Number: 5,713,996
[45] Date of Patent: Feb. 3, 1998

[54] ASPHALT COATING COMPOSITION AND METHOD FOR COATING A SURFACE USING THE SAME

[75] Inventors: Paul A. Morris, East Nantmeal Township; Ronald H. Vega, Exeter Township; Wesley A. Schmidt, Downingtown, all of Pa.

[73] Assignee: Kimberton Enterprises, Inc., Wilmington, Del.

[21] Appl. No.: 787,180

[22] Filed: Jan. 20, 1997

[51] Int. Cl.⁶ .................................... C09D 195/00
[52] U.S. Cl. .................... 106/277; 524/55; 524/60; 138/145
[58] Field of Search .................... 106/277; 524/55, 524/60; 138/145

[56] References Cited

U.S. PATENT DOCUMENTS

| | | |
|---|---|---|
| 2,918,940 | 12/1959 | Carr . |
| 3,045,709 | 7/1962 | Rapp . |
| 3,305,474 | 2/1967 | Knowles et al. . |
| 3,423,221 | 1/1969 | Borgfeldt . |
| 4,158,371 | 6/1979 | Reusser et al. . |
| 4,722,953 | 2/1988 | DeRuiter et al. ............... 524/44 |
| 4,738,723 | 4/1988 | Frizzell et al. . |
| 4,749,622 | 6/1988 | Vonk et al. . |
| 5,034,060 | 7/1991 | Schilling et al. . |
| 5,364,894 | 11/1994 | Portfolio et al. ............... 524/60 |
| 5,460,852 | 10/1995 | Janicki et al. . |
| 5,539,029 | 7/1996 | Burris ............................. 524/60 |
| 5,596,032 | 1/1997 | Schilling et al. ............... 524/60 |

*Primary Examiner*—David Brunsman
*Attorney, Agent, or Firm*—Panitch Schwarze Jacobs & Nadel, P.C.

[57] ABSTRACT

A coating composition useful for coating a surface, such as a pipe surface, includes a water-based emulsion containing an asphalt having a penetration value of no greater than about 10 dmm at 25° C., a latex, at least one thickener and a surface active wetting agent.

20 Claims, No Drawings

ASPHALT COATING COMPOSITION AND METHOD FOR COATING A SURFACE USING THE SAME

BACKGROUND OF THE INVENTION

The present invention relates to asphalt-based coating compositions, more specifically to asphalt-based pipe coating compositions.

Asphalt-based coating compositions are used for many different applications, one primary application being the coating of metallic or partially metallic pipes, conduits, tubing and the like, hereafter referred to collectively as "pipe". As a pipe coating, asphalt-based coating compositions function to provide corrosion-resistance, for sealing and for making pipes more water-resistant. However, most asphalt-based pipe coating compositions which exhibit sufficient coating properties are formed with solvent-based solutions of asphalt and mineral spirits. While these coatings are acceptable for the intended purposes, they release volatile organic compounds (VOCs) while drying. The VOC release can be very significant such that, during the pipe manufacturing process in which the coatings are applied, pipe production must either occasionally be curtailed to avoid VOC releases in excess of EPA standards or EPA fines may be incurred.

Asphaltic aqueous emulsions which do not release VOCs are known, but generally do not have properties which facilitate their use as a coating composition for surfaces such as pipe surfaces. Such emulsions are primarily used for paving, seal slurry treatments, surface coatings for wood fiber insulation or roofing insulation, as an internal sizing agent in thick fiber board, dampproofing and waterproofing.

The thickness and shear sensitivity of aqueous asphalt emulsions, as well as other mechanical properties, generally prevent their use as a direct pipe surface coating. The shear sensitivity becomes critical during application of asphalt coatings. It is desirable to apply most commercial prior art asphalt pipe coatings by spraying as opposed to brushing and rolling which are more time consuming. However, in order to spray the coating on the surface, the coating composition must be able to pass through "airless" sprayers, i.e., high pressure pneumatic sprayers commonly used by pipe manufacturers.

In addition to the shear sensitivity, problems are also encountered with respect to the ability of aqueous emulsions to achieve good adhesion directly to the pipe surface as the asphalt in the aqueous emulsion is sensitive to, and potentially degradable in the presence of, oily substances encountered on some pipe or other surfaces. The emulsions also tend to be temperature sensitive which can create problems when trying to achieve manufacturing coating uniformity in year-round pipe manufacture. Due to the shear sensitivity and poor adhesion properties, it is also difficult, in attempting to apply an aqueous-based emulsion to a pipe surface, to avoid "sag" caused by gravity during the setting process.

Therefore, there is a need in the art for an asphalt-based coating composition which exhibits excellent viscosity properties to provide flexibility with respect to the method of application using either sprayer, brush or roller, and which exhibits a high level of adhesion directly to a surface such as a pipe surface. There is also a need for such a coating which sets quickly and does not exhibit "sag" during setting, and is not tacky after setting. Further, there is a need in the art for an asphalt-based coating composition which does not release a significant amount of VOCs.

BRIEF SUMMARY OF THE INVENTION

The present invention, among other things, provides an asphalt-based pipe coating composition which can be applied by sprayer, brush or roller, is quick setting and exhibits excellent adhesion, viscosity and anti-sag properties, and is not tacky after setting. The compositions of the present invention also do not release VOCs such that environmental compliance is facilitated in the manufacture of coated surfaces such as in manufacturing coated pipes to provide physical protection, corrosion-resistance, and black color to pipe surfaces.

The invention includes a coating composition useful for coating a surface which comprises a water-based emulsion comprising water and an asphalt having a penetration value of no greater than about 10 dmm at 25° C.; a latex; at least one thickener; and a surface active wetting agent.

The invention further includes a pipe which consists essentially of a base pipe having a surface for coating and a coating applied to the surface and formed from a coating composition which comprises a water-based emulsion comprising water and an asphalt having a penetration value of no greater than about 10 dmm at 25° C.; a latex; at least one thickener; and a surface active wetting agent.

The invention also includes an improved method for protecting a surface of a pipe by applying a coating composition to the surface of the pipe and allowing the coating composition to solidify, wherein the improvement comprises providing as the coating composition, an asphalt-based coating composition which comprises a water-based emulsion comprising: water, an asphalt having a penetration value of no greater than about 10 dmm at 25° C., at least one emulsifier selected from the group consisting of a wood resin and a tall oil resin, and a dilute aqueous hydroxide solution; a latex; at least one thickener; and a surface active wetting agent.

DETAILED DESCRIPTION OF THE INVENTION

The present invention includes a coating composition for coating a surface, and preferably useful for coating the surface of a pipe. The coating composition may be used for various purposes, for example, for providing corrosion resistance to a surface, protecting the underlying surface from physical damage, or for rendering the surface water-resistant.

The type of surface which may be protected is not limited; however, the coating composition is particularly developed for protecting and exhibiting increased adherence to surfaces which are at least partially metallic, and more particularly, as a coating for pipe such as ductile iron pipe. The coating may be used on various pipe surfaces which are metal or partially metal, concrete, ceramic, plastic and other pipe surfaces. The coating is also particularly designed for use on the exterior surfaces of pipe. The coating may be used on interior surfaces as well if it meets the particular requirements for an interior surface coating for a given pipe use. The coating composition shows excellent adhesion to pipe surfaces which may be soiled by oil or similar lipophilic, deposited materials, exhibits excellent viscosity properties for allowing flexibility in the manner of application, sets quickly once applied and resists "sag".

The surface may be arcuate, such as the exterior surface of a pipe, flat or of any geometry. While the coating was developed for use on arcuate pipe surfaces, due to the quick-setting ability and ability to resist "sag", the coating is not specifically limited to use on any particular surface geometry.

The composition includes a water-based asphalt emulsion which preferably includes a de-asphaltized "DA" grade asphalt. DA asphalt is taken from "straight-run" asphalt which is formed from the distillation bottoms from crude oil refining. The DA asphalt is formed when the straight-run asphalt is subjected to further refining by solvent extraction to extract any remaining oil. The residue from the solvent extraction step is "de-asphaltized" asphalt which is very hard asphalt with a substantially low oil content due to the solvent extraction. DA asphalt is thus distinguished from standard, commercially available straight-run asphalts or "oxidized asphalts" used in coating compositions. An oxidized asphalt is a treated straight-run asphalt which has been oxidized to raise its softening point. While DA aphalt is preferred, other asphalts which are further refined or processed to have the characteristics of DA asphalt may also be used.

The asphalt useful in the present invention should have a penetration value of no greater than about 10 dmm at 25° C. which is typically achievable with DA grade asphalt. Preferably no greater than 5 and more preferably no greater than about 2 dmm. It is also preferred that the softening point of the DA asphalt be from about 62° C. to about 91° C., most preferably from about 76 to about 78° C. Such an asphalt is available as Monar DA grade asphalt, available from Sun Oil of Toledo, Ohio.

The low oil content of the asphalt is very beneficial in the present composition, particularly when used on pipes, as it provides good adherence even when the pipe has oily substances on its surface. The low oil content of the DA asphalt allows for oil absorption such that the oil, or similar lipophilic substances on the surface to be coated, does not interfere with direct adhesion to the surface.

DA asphalts are commercially available in a water-based emulsion form from Monsey Bakor, of Kimberton, Pa. as Emulsions 026 and 028 for use as coatings for wood fiber insulation or as an internal sizing agent for thick fiber board.

With respect to the water-based emulsion component of the present composition, the water content may be varied depending on the desired emulsion properties. However, sufficient water must be provided to form the emulsion and to keep the components of the composition separated in the liquid state. In addition, the amount of water must not be so high that the composition can no longer form a film for coating. Preferably, the water content of the coating composition ranges from about 25 wt % to about 85 wt %, and more preferably, the water content is from about 36 wt % to about 40 wt % of the coating composition.

Similarly, the asphalt content may be varied in an inverse manner with respect to the water content. The asphalt content must not be so high that the composition cannot be emulsified, and not so low that it cannot provide a coatable film. As such, the asphalt content may range from about 75 wt % to about 15 wt %, and more preferably from about 40 to about 50 wt % of the coating composition.

Preferably, the water-based asphalt emulsion provided to the coating composition includes at least one emulsifier. The emulsifier(s) can be any suitable cationic or anionic asphalt emulsifier; however, it is preferred that the emulsifiers be anionic. While non-ionic emulsifiers may be used, they are not preferred due to a tendency to lead to water sensitivity in the emulsion. The emulsifier(s) should be no greater than about 10 wt % total of the coating composition. While more than 10 wt % can be used, addition of more than about 10 wt % produces little improvement with respect to coating properties and becomes uneconomical due to the high cost of such emulsifiers. In addition, due to the presence of a surfactant in the coating composition, greater than about 10 wt % emulsifiers can also make the emulsion too water sensitive.

The preferred asphalt emulsifiers include natural or synthetic organic emulsifiers such as tall oil resin, wood-derived resins and similar asphalt emulsifying compounds either chemically reacted or unreacted. Preferred emulsifiers are available as concentrated Vinsol® soap, derived from a pine wood resin material and Unitol® NCY, a tall oil resin having —COOH functionality which also functions as a stabilizer. A mixture of emulsifiers can also be used. In one preferred embodiment, the water-based emulsion includes a mixture of wood resin and tall oil resin in a weight percentage ratio of wood resin to tall oil resin of from about 14:1 to about 27.5:1.

In the preferred embodiment using wood resin and/or tall oil emulsifiers for the asphalt coating composition, it is preferred that a small amount of a dilute aqueous hydroxide solution be added to the composition, preferably a hydroxide such as potassium, sodium, lithium, organic amines or a similar compound. The 100% hydroxide is preferably diluted to about 45% in water, and is used for reacting with the emulsifier(s) to form soaps. The amount of 100% hydroxide is determined based on the amount of emulsifier(s) and is typically selected to be about 12.5 to about 17.5 wt % of the total amount of the emulsifier(s) (at 100% concentration). In the preferred embodiment, as described further below, the hydroxide also functions to activate the acrylic thickener, which is preferably selected to function in an alkaline pH. Preferably, the composition includes from about 0.1 to about 1.0 wt %, and more preferably from about 0.25 to about 0.35 wt % of dilute aqueous hydroxide solution, more preferably aqueous potassium hydroxide solution diluted to about 45%.

The coating composition preferably comprises at least one thickener. The water-based emulsion in the coating composition preferably comprises an emulsion thickener(s). The coating composition thickener(s) and the emulsion thickener (s) may be the same; however, it is preferred that the coating composition thickener(s) and the emulsion thickener(s) be different for contributing to the preferred coating properties of the present invention, including improved sprayability and resistance to sag and settling. In forming the water-based emulsion, any suitable emulsion thickener capable of preventing the emulsion of water and asphalt from settling out may be selected. Commercial water-based asphalt emulsions typically already include such an emulsion thickener. To facilitate formulation of the coating composition, commercial emulsions including such thickeners can be used; however, the coating composition may be formed without use of such commercial emulsions. Emulsion 026 discussed above includes oxalic acid in combination with a mineral filler as an emulsion thickening system. Any suitable mineral filler or colloidal mineral suspensoid (collectively referred to herein as "mineral filler") may be used; however, bentonite clay is preferred. Oxalic acid may be used with the mineral filler preferably in a weight percentage ratio of from about 45:1 to about 50:1 mineral filler to oxalic acid.

The coating composition of the present invention may include the preferred, combined mineral filler and oxalic acid thickening system in an amount of from about 0 (if another thickener is substituted) to about 2.2 wt %. It is most preferred that the mineral filler be present in an amount of from about 0.01 to about 2 wt %, more preferably from about 0.45 to about 0.50 wt %, and the oxalic acid be present in an amount of from about 0.005 to about 0.2 wt %, more preferably from about 0.009 to about 0.010 wt % of the coating composition.

In addition to the water-based asphalt emulsion as described above, the coating composition also includes a latex. The latex component provides water resistance to the coating composition and should be compatible with the other components in the composition. It should be understood from this disclosure, that any latex or other rubbery-type components or emulsions capable of providing the proper water-resistance, which are compatible with the composition and which do not negatively effect the quick-setting property of the present coating composition, may be used. Preferably, the latex is a styrene-acrylic-based latex which is anionically stabilized and in an emulsion form having from about 40 to about 60 percent by weight solids. It is also preferred that the latex have a sufficiently low glass transition temperature for film formation. A suitable latex is commercially available as Rhodopas GS125G® styrene-acrylic latex from Rhone-Poulenc, Specialty Chemicals in Kennesaw, Ga.

The latex component is present in an amount in relation to the quantity of asphalt in the composition. Preferably, the latex is provided in an amount which is not greater than about 10 wt % of the asphalt. Sufficient latex should be provided to provide effective water resistance; however, too much latex can cause a loss of the quick-setting capability of the coating composition. In order to satisfy these criteria, the latex is added in an amount of from about 2 to about 20 wt %, preferably from about 5 to about 15 wt %, and more preferably from about 9.00 to about 9.10 wt % of the coating composition.

The coating composition also preferably includes a surfactant, specifically a defoaming compound, to prevent foaming during mixing. Any suitable surfactant and defoamer which can perform this function may be used; however, it is preferred that the surfactant/defoamer be anionic and, more preferably, an anionic silicone-based surfactant, such as an aqueous silicone emulsion. An example of such a surfactant is Dow 1410 Antifoam® available from Dow Corning Corp. The surfactant should be provided in an amount sufficient to act as a defoamer and prevent foaming, and preferably from about 0.09 to about 1.5 wt %, more preferably from about 0.09 to about 0.11 wt % of the coating composition.

The overall composition includes at least one thickener which may be the same or different from the optional emulsion thickener(s) described above. Emulsion thickener(s) are primarily provided to prevent settling of the asphalt in the water-based emulsion. However, the composition also requires at least one thickener which improves the "sag" property and provides low viscosity at high shear rate to the composition during mixing and application to a surface. These functions may be carried out with one overall thickener, or by use of an emulsion thickener and at least one additional coating composition thickener. If the viscosity is too low, the composition will tend to liquefy and sag during application. However, if the viscosity is kept high, the composition will stay in place when applied and quickly set on a surface even if the surface is other than flat and horizontally aligned. The thickener(s) function to adjust viscosity at different shear rates and provide stability so that the composition may be applied to a surface, such as a pipe surface, by spraying, rolling or brushing. In order to be able to pass the composition through an application device such as a piston pump, such that the composition is useful in pipe manufacture, the viscosity must be properly adjusted by the composition thickener(s). It is preferred that a combination of thickeners is used which is capable of providing optimum viscosity values which are as high as possible at low shear rates, and as low as possible under high shear rates.

In the preferred embodiment of the coating composition, an acrylic-based thickener is combined with a xanthan gum thickener in a weight percentage ratio of from about 20:1 to about 25:1 acrylic-based thickener to xanthan gum thickener. A suitable commercially available acrylic-based thickener is Polyphobe® 106HE from Union Carbide. This thickener is available in liquid form, is easy to handle and contributes to reducing sag. While this thickener works well, it is preferred that it be used in an alkaline pH to achieve the best results. As such, the composition pH may have to be adjusted. In the preferred embodiment, in which dilute aqueous hydroxide is already added to the composition for use with the wood resin and tall oil in the emulsion component, the pH should already be at an optimum level for using this particular acrylic thickener.

A suitable commercially available xanthan gum thickener is Kelzan® AR available from Kelco, a division of Monsanto Chemical Corporation. While these thickeners are preferred, other thickeners, alone or in combination may be used as long as an adequate viscosity profile is achieved. Preferably, the thickener(s) are provided to the coating composition in a total amount of from about 0.1 to about 6.0 wt %, more preferably from about 0.51 to about 6.0 wt %. If using an acrylic thickener and a xanthan gum thickener in combination, it is further preferred that the acrylic thickener be from about 1.15 to about 1.25 wt % of the composition and the xanthan gum thickener be about 0.045 to about 0.055 wt % of the composition.

In addition to the water-based emulsion, latex, surfactant and thickener(s), the coating composition also preferably includes a surface active wetting agent. The surface active wetting agent may be any surfactant capable of penetrating oil or other materials which may be present on a surface to be coated such that the low-oil content DA asphalt may adhere directly to the surface. Preferably, the surface active wetting agent includes an active ingredient such as sodium dioctyl sulfosuccinate or a similar compound, and should be provided in an amount of from about 0.1 to about 2 wt %, more preferably from about 0.95 to about 1.05 wt % of the composition. A suitable commercially available surface active wetting agent is Aerosol® OT 75% Surfactant from Cytec.

While not necessary, the coating composition also preferably includes a biocide agent for protecting the composition from microbiological degradation. Such a biocide should be present in an amount of from about 0.01 to about 0.5 wt % of the composition.

The coating composition is preferably prepared by first forming the water-based asphalt emulsion, or by using a commercial water-based asphalt emulsion meeting the above criteria, and then combining the emulsion with the remaining components. However, the components may be combined simultaneously. Mixing may occur in a horizontal tank with agitation or in a vertical mixing tank.

The present invention also includes an improved method for coating a surface of a pipe. The method includes the steps of applying the coating composition to the surface of a pipe, for example by brushing, rolling or spraying, and allowing the coating composition to solidify. The coating composition is preferably applied at a thickness of about 0.015 cm, however, the thickness may be varied for different coating applications. The composition is preferably allowed to dry and solidify to water resistance in about 4 hours or less at 50% relative humidity at 22° C. (room temperature). When applying the coating to pipe which is not newly manufactured, it is preferred that loose dirt, scale and/or oily components be removed to the extent possible for a smooth coating and for maximum adhesion. The coating may be applied over a wide range of temperatures, however, warmer temperatures for the substrate and the composition quicken drying times. The maximum temperature for the composition is about 54° C. and for the substrate is about 65° C. The composition may be applied at any angle and the orientation of the pipe is not significant to the overall coating method.

The improvement to the method includes providing as the coating composition an asphalt-based coating composition. The composition includes water, an asphalt having a penetration value of no greater than about 10 dmm at 25° C. as described above, at least one emulsifier such as the tall oil and wood resin emulsifiers above, a dilute aqueous hydroxide solution, latex, surfactant, at least one thickener and a surface active wetting agent. The composition also preferably includes an emulsion thickener such as oxalic acid and mineral filler, and a biocide. These components are preferably those described above in the preferred coating composition combined in the amounts described.

The present invention also includes a pipe which consists essentially of a pipe having at least one surface, such as an exterior surface for coating, and a coating applied to that surface and formed from a composition such as that described in detail above.

The invention will now be described in more detail with respect to the following, specific non-limiting example:

EXAMPLE 1

An asphalt emulsion is prepared by first heating DA grade Monar® asphalt to form an asphaltic phase in a heated mixing tank at a temperature of 182° C. COOH—functionalized tall oil resin (Unitol® NCY) is added to the asphaltic phase. In a separate tank a water phase is prepared by combining water at a temperature of 60° C., pinewood resin soap (concentrated Vinsol® soap at 20% solids) heated to 71° C. and 45% dilute aqueous potassium hydroxide solution. The asphaltic phase and water phase are simultaneously fed through a mill. The milled components then pass through a heat exchanger to cool the mixture to a temperature of 60° C. The mixture passes to a holding tank under agitation and then passes to a secondary mixing tank where the remaining components listed below are added to the mixture in the amounts shown. The final mixture passes through a gear pump and is filtered through a 0.025 cm pore size. The composition is mixed throughout the process to avoid lumping of the composition. The Kelzan® is added to the mixture once the water is present. The Polyphobe® is added after the potassium hydroxide as it functions best in alkaline pH and due to the pH sensitivity, it is better provided as a diluted component. The overall formulation includes the following components:

| Component | Amount (wt %) |
|---|---|
| Water | 38.07 |
| Pinewood resin (Concentrated Vinsol® at 20% solids) | 4.97 |
| Potassium Hydroxide (45% dilute solution) | 0.30 |
| Oxalic Acid | 0.01 |
| Bentonite Clay | 0.48 |
| Tall Oil Resin (Unitol® NCY) | 0.23 |
| Asphalt (Monar® DA Grade) | 44.46 |
| Styrene-Acrylic Latex (GS125G) | 9.04 |
| Surfactant (Dow 1410 Antifoam®) | 0.10 |
| Acrylic-Based Thickener (Polyphobe® 106HE) | 1.19 |

-continued

| Component | Amount (wt %) |
|---|---|
| Xanthan Gum Thickener (Kelzan® AR) | 0.05 |
| Biocide (Kathon® LX 1.5) | 0.10 |
| Surface Active Wetting Agent (Aerosol® OT-75) | 1.00 |

The finished composition is applied with a pneumatic high pressure sprayer to the exterior surface of a ductile iron pipe. The coating sets quickly and does not exhibit sag during the setting process. The coating is water-and corrosion-resistant. The coating also does not release VOCs.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:
1. A coating composition useful for coating a surface, comprising:
 (a) a water-based emulsion comprising water and an asphalt having a penetration value of no greater than about 10 dmm at 25° C.;
 (b) a latex;
 (c) at least one thickener; and
 (d) a surface active wetting agent.
2. The coating composition according to claim 1, wherein the asphalt is a residue derived from solvent extraction of a bottoms product of distillation of crude oil having a softening point of from about 62° C. to about 91° C.
3. The coating composition according to claim 1, wherein the penetration value of the asphalt is no greater than about 5 dmm at 25° C.
4. The coating composition according to claim 1, wherein the at least one thickener is selected from the group consisting of an acrylic-based thickener and a xanthan gum thickener.
5. The coating composition according to claim 4, wherein the at least one thickener includes both thickeners in a weight percentage ratio of acrylic-based thickener to xanthan gum thickener from about 20:1 to about 25:1.
6. The coating composition according to claim 1, wherein the surface active wetting agent comprises sodium dioctyl sulfosuccinate.
7. The coating composition according to claim 1, further comprising a surfactant.
8. The coating composition according to claim 7, wherein the surfactant is an anionic aqueous silicone emulsion.
9. The coating composition according to claim 1, further comprising from about 0.01 to about 0.5 wt % of a biocide.
10. The coating composition according to claim 1, wherein the water-based emulsion further comprises:
 (i) at least one emulsifier selected from the group consisting of a wood resin and a tall oil resin; and
 (ii) a dilute aqueous hydroxide solution.
11. The coating composition according to claim 10, wherein the wood resin is a concentrated soap derived from pine wood.
12. The coating composition according to claim 10, wherein the at least one emulsifier is a mixture of the wood resin and the tall oil resin in a weight percentage ratio of wood resin to tall oil resin of from about 14:1 to about 27.5:1.

13. The coating composition according to claim 10, wherein the dilute aqueous hydroxide solution is an about 45% solution and the composition comprises from about 0.25 to about 0.35 wt % of the dilute hydroxide solution.

14. The coating composition according to claim 10, wherein the water-based emulsion further comprises an emulsion thickener.

15. The coating composition according to claim 14, wherein the emulsion thickener comprises oxalic acid and a mineral filler in a weight percentage ratio of the mineral filler to the oxalic acid of from about 45:1 to 50:1.

16. The coating composition according to claim 15, wherein the mineral filler is bentonite clay.

17. The coating composition according to claim 15, wherein the composition comprises:

from about 15 to about 75 wt % of the asphalt; from about 25 to about 85 wt % water; from about 0.01 to about 10 wt % of the at least one emulsifier; from about 0.1 to about 1 wt % of the dilute aqueous hydroxide solution; from about 0.005 to about 0.2 wt % of the oxalic acid; from about 0.01 to about 2 wt % of the mineral filler; from about 2 to about 20 wt % of the latex; from about 0.09 to about 1.5 wt % of the surfactant; from about 0.1–6.0 wt % of the at least one thickener; and from about 0.1–2 wt % of the surface active wetting agent.

18. The coating composition according to claim 17, wherein the composition comprises from about 40 to about 50 wt % of the asphalt; from about 36 to about 40 wt % water; from about 5 to about 15 wt % of the latex; from about 0.51 to about 6.0 wt % of the at least one thickener; and from about 0.95 to about 1.05 wt % of the surface active wetting agent.

19. A pipe consisting essentially of a base pipe having a surface for coating and a coating applied to the surface and formed from a coating composition comprising:

(a) a water-based emulsion comprising water and an asphalt having a penetration value of no greater than about 10 dmm at 25° C.;

(b) a latex;

(c) at least one thickener; and (d) a surface active wetting agent.

20. In a method for protecting a surface of a pipe comprising the steps of applying a coating composition to the surface of the pipe and allowing said coating composition to solidify, the improvement comprising providing as the coating composition, an asphalt-based coating composition comprising:

(a) a water-based emulsion comprising:
   (i) water
   (ii) an asphalt having a penetration value of no greater than about 10 dmm at 25° C.;
   (iii) at least one emulsifier selected from the group consisting of a wood resin and a tall oil resin; and
   (iv) a dilute aqueous hydroxide solution;

(b) a latex;

(c) at least one thickener; and (d) a surface active wetting agent.

* * * * *